US010866615B1

(12) United States Patent
Ng et al.

(10) Patent No.: US 10,866,615 B1
(45) Date of Patent: Dec. 15, 2020

(54) ELECTRONIC DEVICES WITH TWO-STAGE DISPLAYS

(71) Applicant: Apple Inc., Cupertino, CA (US)

(72) Inventors: Harry K. Ng, Rowland Heights, CA (US); Alvin K. Ng, Rowland Heights, CA (US); Katherine E. Tong, San Francisco, CA (US); Tyler S. Bushnell, Mountain View, CA (US); Amin M. Younes, Mountain View, CA (US); Benjamin S. Bustle, Cupertino, CA (US); Christopher D. Jones, Los Gatos, CA (US); James R. Wilson, Cupertino, CA (US)

(73) Assignee: Apple Inc., Cupertiono, CA (US)

(*) Notice: Subject to any disclaimer, the term of this patent is extended or adjusted under 35 U.S.C. 154(b) by 108 days.

(21) Appl. No.: 15/896,733

(22) Filed: Feb. 14, 2018

Related U.S. Application Data

(60) Provisional application No. 62/546,417, filed on Aug. 16, 2017.

(51) Int. Cl.
*G06F 1/16* (2006.01)
*G09G 3/3208* (2016.01)
*G06F 3/044* (2006.01)

(52) U.S. Cl.
CPC .......... *G06F 1/1626* (2013.01); *G06F 3/044* (2013.01); *G09G 3/3208* (2013.01); *G09G 2300/046* (2013.01)

(58) Field of Classification Search
None
See application file for complete search history.

(56) References Cited

U.S. PATENT DOCUMENTS

| 6,481,851 | B1* | 11/2002 | McNelley | G02B 27/2292 345/5 |
| 9,081,541 | B2 | 7/2015 | Jung | |
| 2004/0150584 | A1 | 8/2004 | Chuman et al. | |

(Continued)

OTHER PUBLICATIONS

Gadget Hacks (Get the Front-Facing Flash Feature from the New IPhones Right Now [How-to], https://www.youtube.com/watch?time_continue=8&v=I8NP8bU6c2A Gadget Hacks, 2015) (Year: 2015).*

(Continued)

*Primary Examiner* — Matthew Yeung
(74) *Attorney, Agent, or Firm* — Treyz Law Group, P.C.; G. Victor Treyz; David K. Cole

(57) ABSTRACT

An electronic device display may have an inner layer with a pixel array for displaying images and an outer layer with an array of light modulator cells operable in transparent and light-blocking modes. Force sensor and touch sensor circuitry may be used to gather user input such as information on finger pressure or stylus input applied to a location on the display. A block of the cells may be placed into a transparent mode to form a transparent window based on information from the sensor circuitry. Images on the pixel array may be viewed through the window. In another mode of operation, images can be displayed by adjusting the cells of the light modulator layer and backlight illumination may be provided by the pixel array. A camera and a flash or other optical components may be overlapped by an adjustable shutter.

33 Claims, 11 Drawing Sheets

(56) References Cited

U.S. PATENT DOCUMENTS

| | | | |
|---|---|---|---|
| 2006/0097991 A1* | 5/2006 | Hotelling | G06F 3/0416 345/173 |
| 2007/0013624 A1* | 1/2007 | Bourhill | B82Y 20/00 345/84 |
| 2008/0192013 A1 | 8/2008 | Barrus et al. | |
| 2009/0005011 A1* | 1/2009 | Christie | G06Q 10/107 455/412.2 |
| 2009/0027306 A1 | 1/2009 | Kawabe | |
| 2012/0105487 A1 | 5/2012 | Son et al. | |
| 2013/0194167 A1* | 8/2013 | Yun | H01L 27/3232 345/84 |
| 2013/0271445 A1 | 10/2013 | Park et al. | |
| 2014/0033119 A1* | 1/2014 | Kim | G06F 3/0481 715/800 |
| 2014/0139637 A1* | 5/2014 | Mistry | G06F 1/163 348/46 |
| 2014/0293188 A1* | 10/2014 | Chen | G09G 3/3426 349/65 |
| 2015/0067602 A1* | 3/2015 | Bernstein | G06F 3/0488 715/823 |
| 2015/0228217 A1* | 8/2015 | Perdices-Gonzalez | G09G 3/348 345/5 |
| 2016/0196785 A1 | 7/2016 | Amesz | |
| 2016/0328023 A1* | 11/2016 | Mistry | G06F 3/014 |

OTHER PUBLICATIONS

Evans, Jonny, "10 3D Touch Messages secrets iPhone users need" https://www.computerworld.com/article/3031715/10-3d-touch-messages-secrets-iphone-users-need.html, 2016). (Year: 2016).*

IVideos, "iOS 10 How to Enable 3D Touch & Tutorial iPhone 7 & iPhone 7 Plus", https://www.youtube.com/watch?v=x-NnfuAccwo, 2016) (Year: 2016).*

* cited by examiner

ELECTRONIC DEVICES WITH TWO-STAGE DISPLAYS

This patent application claims the benefit of provisional patent application No. 62/546,417, filed on Aug. 16, 2017, which is hereby incorporated by reference herein in its entirety.

FIELD

This relates generally to electronic equipment, and, more particularly, to electronic devices with optical components.

BACKGROUND

Electronic devices such as cellular telephones sometimes have displays and other optical components such as cameras and camera flash devices. It can be challenging to incorporate optical components such as these into an electronic device. If care is not taken, displays will consume excess power or will not exhibit desired flexibility during operation. Displays may also be unattractive when not in use. In some configurations, devices will have unattractive windows to accommodate cameras and flashes.

SUMMARY

An electronic device may be provided with a two-stage display. The display may have an inner layer with a pixel array for displaying images and an outer layer formed from a light modulator with an array of cells that can each be placed in a transparent mode or a light-blocking mode. Force sensor and touch sensor circuitry and other input-output devices may be used to gather user input such as information on finger pressure or stylus input applied to a location on the display.

A block of the cells in the light modulator may be placed into a transparent mode to form a transparent window based on information from the sensor circuitry such as information on the location of the finger pressure or stylus input. Images on the pixel array may be viewed through the window. The type of content that is displayed through the transparent window may depend on the location of the window within the display and on user input such as information on the location of the finger pressure or stylus input.

In another mode of operation, images can be displayed by adjusting the cells of the light modulator layer to form the images. Images formed with the light modulator cells may be supplied with backlight illumination from the pixel array. The backlight illumination may be static or time-varying and may be monochromatic or colored.

The electronic device may have optical components. The optical components may include a camera for capturing images and a flash for illuminating external objects during image capture operations. Optical components such as the flash and camera may be overlapped by an adjustable shutter. The shutter may be formed from a guest-host liquid crystal device or other device with an adjustable state. In a first state, the shutter may have an appearance that matches the housing of the electronic device. When it is desired to capture images, control circuitry in the electronic device may temporarily place the shutter in a transparent mode to allow light from a flash and/or light being imaged by the camera to pass.

DETAILED DESCRIPTION

It may be desirable for an electronic device to display information for a user. For example, an electronic device may display information such as date and time information. As another example, an electronic device may display video clips. Different types of content may be displayed using different types of display structures. For example, static or slowly updated content such as information on the current time and date may sometimes be satisfactorily displayed using relatively low-power displays which may have low frame rates and other modest display characteristics (e.g., relatively modest amounts of resolution, dynamic range, color gamut, etc.), whereas video clips or other more demanding content may be satisfactorily displayed using a display with light-emitting pixels such as an organic light-emitting diode display or backlight liquid crystal display. Displays such as these can exhibit high frame rates and other desirable display characteristics such as high resolution, high dynamic range, and wide color gamut. In some arrangements, it may be desirable to adjust the outwards appearance of a device or a portion of a device to enhance device aesthetics.

Figure 1:
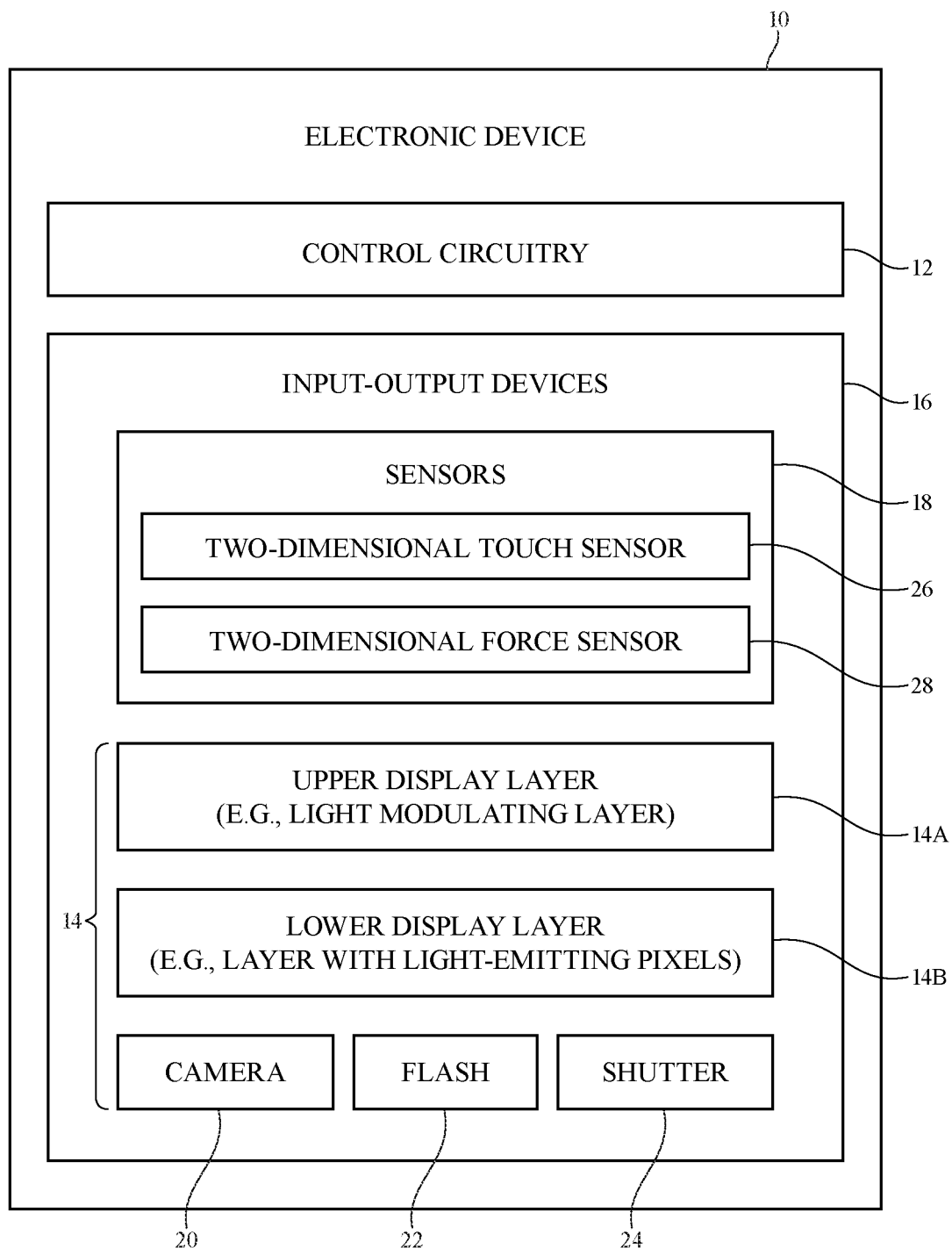
FIG. 1 is a schematic diagram of an illustrative electronic device in accordance with an embodiment.

To accommodate these different goals within an electronic device, an electronic device may be provided with a dual-stage display having stacked upper and lower displays layers and/or may be provided with electrically adjustable shutters to selectively hide cameras, camera flashes, and other optical components from view when not in use. A schematic diagram of an illustrative electronic device of the type that may include a dual-stage display and/or shutters is shown in FIG. 1. Electronic device 10 of FIG. 1 may be any suitable electronic device such as a cellular telephone, a laptop computer, a tablet computer, a media player, or other hand-held or portable electronic device, a smaller device such as a wrist-watch device (e.g., a watch with a wrist strap), a pendant device, a headphone or earpiece device, a device embedded in eyeglasses or other head-mounted equipment worn on a user's head, or other wearable or miniature device, a computer display containing an embedded computer, a computer display that does not contain an embedded computer, a gaming device, a navigation device, an embedded system such as a system in which electronic equipment with a display is mounted in a kiosk or automobile, a remote control, a voice-controlled internet-connected speaker (e.g., an artificial intelligence assistance device, home assistant, etc.), a set-top box, equipment that implements the functionality of two or more of these devices, or other electronic equipment. Illustrative configurations in which device 10 is a portable device with a display such as a cellular telephone, wristwatch, or tablet computer may sometimes be described herein as an example.

As shown in FIG. 1, electronic device 10 may include control circuitry such as control circuitry 12. Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10 (e.g., controlling electrically adjustable components, displaying images on displays, etc.). The processing circuitry may be based on one or more microprocessors, microcontrollers, digital signal processors, baseband processors, power management units, audio chips, application specific integrated circuits, etc. If desired, circuitry 12 may include wired and/or wireless communications circuitry. The communications circuitry may be used to support communications over one or more wired or wireless communications links. Wireless circuitry in circuitry 12 may include one or more antennas and one or more radio-frequency transceiver circuits. Wireless communications circuitry may be used to support wireless communications over cellular telephone bands, wireless local area network bands, near field communications bands, etc.

Device 10 may include input-output devices 16 to allow input to be gathered from a user, from the environment, or from external devices and to allow output to be supplied (e.g., to external equipment, to a user of device 10, etc.). Input-output devices 16 may, for example, include buttons, joysticks, scrolling wheels, touch pads, key pads, keyboards, microphones, speakers, tone generators, vibrators, cameras, displays and/or other light-emitting components, light-emitting diodes and other status indicators, data ports, etc. Input-output devices 16 may also include sensors such as sensors 18. Sensors 18 may include microphones, force sensors, touch sensors, sensors that gather both touch and force (e.g., combined touch and force sensors formed by overlapping touch and force sensor components and/or components that measure both touch and force), temperature sensors, air pressure sensors, moisture sensors, ambient light sensors and other light-based sensors, three-dimensional gesture sensors, proximity sensors, gaze detection (eye tracking) sensors, infrared cameras and other infrared sensors, optical sensors such as visible light sensors, magnetic sensors, and sensors for measuring the orientation, movement, and/or position of device 10 such as inertial measurement units that include accelerometers, compasses, and/or gyroscopes.

Device 10 may include a display such as display 14. Display 14 may include a pair of stacked display devices (sometimes referred to as stacked displays or stacked display layers) such as upper (or outer) display layer 14A (sometimes referred to as a display, light modulator, light modulator layer, array of light modulator cells, etc.) and lower (or inner) display layer 14B (sometimes referred to as a display or pixel array). Control circuitry 12 may display content that is visible to a user of device 10 by adjusting the operation of layer 14A and/or layer 14B.

Lower layer 14B may have an array of pixels that is configured to produce images. Lower layer 14B may, for example, be a backlit liquid crystal display, a light-emitting diode display formed from individual crystalline semiconductor light-emitting diode dies, an organic light-emitting diode display, or other display with a pixel array that emits light for forming images.

Upper layer 14A generally does not emit light and serves as an adjustable light modulation layer. Layer 14A may, for example, have one or more adjustable areas (cells) that exhibit adjustable light transmission values. When it is desired to obscure lower layer 14B, upper layer 14A may be placed in a low-transmission state. When it is desired to allow some or all of lower layer 14 to be viewed by a user, a corresponding region in upper layer 14A may be placed in a high-transmission (transparent) state to form a transparent window.

In some configurations, upper layer 14A may have an array of individually adjustable cells of relatively high resolution (small cell-to-cell pitch values). This type of configuration may be used to allow layer 14A to display images. Display 14B may serve as a backlight for these images.

In other configurations, upper layer 14A may have relatively low resolution (e.g., layer 14A may have 1-10 or 1-100 different independently adjustable cells as examples). In this type of configuration, upper layer 14A is not generally considered to be capable of displaying images due to its low light-modulating cell count, but nonetheless can create selectively transparent windows that reveal particular portions of lower layer 14B.

In general, display 14 may include layers formed from any suitable display structures such as organic light-emitting diode layers, liquid crystal layers, electrochromic layers, suspended particle device layers, guest-host liquid crystal layers, polymer dispersed liquid crystal layers, guest-hose polymer dispersed liquid crystal layers, electrophoretic layers, electrowetting layers, and/or other display layers. Layers such as these may serve as a light-emitting layer for layer 14B (e.g., when backlit with an edge-lit light guide layer or a direct-lit backlight having an array of light-emitting diodes) and/or may serve as a light modulator layer for layer 14A. Each of the layers of display 14 (e.g., layers 14A and/or 14B) may include any suitable number of independently adjustable regions (areas/cells/pixels) such as at least one, at least 10, at least 100, at least 1000, at least 10,000, at least 100,000, at least 1,000,000, less than 1,000,000, less than 100,000, less than 10,000, less than 1000, less than 100, less than 10, 1, etc.

Touch sensors and force (pressure) sensors in device 10 may, if desired, be configured to gather two-dimensional touch input and/or two-dimensional force input resulting from the presence of one or more fingers, a stylus, or other external object on display 14. For example, device 10 may include a capacitive touch sensor with an array of indium tin oxide capacitive touch sensor electrodes or other transparent touch sensor electrodes that overlaps display 14 and that gathers two-dimensional touch input associated with one or more fingers of a user contacting the touch sensor and display, may have a capacitive touch sensor or other two-dimensional sensor (force, optical, capacitive, acoustic, etc.) for gathering two-dimensional input associated with stylus input at a location on the touch sensor and display, other may have other sensors for gathering touch input, force input, and/or other two-dimensional sensor input. Touch input is gathered by determining where an object has contacted a touch sensitive sensor without regard to the amount of force associated with the touch input. Force input is gathered by determining how much pressure has been applied by an object to a force sensor. Sensors that gather both touch and force input may use, for example, a capacitive touch sensor to determine where a finger, stylus, or other object has contacted the sensor and can use a strain gauge sensor, capacitive force sensor, or other pressure sensor to measure applied force.

Two-dimensional sensors such as two-dimensional touch sensor 26 and two-dimensional force sensor 28 and/or other two-dimensional sensors may be used in gathering information on where a user's fingers or other external objects have contacted display 14, may be used in measuring how forcefully a user is pressing display 14, may be used in gathering stylus input, and/or may be used in gathering other input. In some arrangements, touch and force data (from a finger, stylus, etc.) may be combined (e.g., to accurately detect where a user or stylus is pressing downwards on display 14 while measuring how forcefully the user or stylus is pressing downwards on display 14). Sensors 26 and 28 may be configured to handle multiple fingers or stylus inputs at a time (e.g., these sensors may be used in gathering multi-touch gestures such as two-finger or three-finger taps or swipes, pinch-to-zoom gestures, and/or other multi-finger touch and/or force gestures). In some arrangements, the amount of time that a user's finger or fingers or stylus has pressed against display 14 may be measured be sensor 26 and/or sensor 28. For example, a touch-based gesture may involve contacting a particular location (or locations) on display 14 or a force-based gesture may involve pressing forcefully on a particular location (or locations) on display 14 for more than a given amount of time (e.g., more than 100 ms, more than 500 ms, more than 1 s, less than 2 s, or other suitable threshold dwell time). Finger gestures that use combinations of these techniques in supplying touch and/or force input to device 10 and/or stylus input (e.g., stylus input for a two-dimensional capacitive stylus sensor that may also serve as a touch sensor for finger input, other stylus sensors, etc.) may also be used. In general, user input for directing device 10 to perform a desired action may include any desired combination of: finger input, stylus input, and/or input from other external objects, input with one such object or multi-location input with two or more such objects, time-based input (e.g., measuring how long one or more objects supply touch input and/or supply more than a threshold amount of force input), input that includes only touch input, input that includes only force input, and/or input that combines both touch and force input. User input to device 10 may also include voice input, three-dimensional gesture input, orientation input from an accelerometer or other sensor, motion input, magnetic sensor input, input from a wirelessly coupled input device such as a trackpad, mouse, pen, joystick, keyboard, etc.), input from acoustic sensors or sensors based on magnetic sensing, inertial sensing, location sensing, air pressure sensing, temperature sensing, gaze detection sensing, camera sensing, three-dimensional camera sensing, and/or user input gathered using any other suitable user input gathering components). In some embodiments described herein, device 10 takes action based on touch input, force input, combined touch and force input, or other user input. These are illustrative examples. In general, any of the illustrative responses of device 10 to user input that are described herein may be made based on any of the illustrative types of user input described herein (e.g., touch input at one or more locations on a two-dimensional sensor, force input at one or more locations on a two-dimensional sensor, input at one or more locations on a two-dimensional sensor that includes both touch sensing and force sensing, etc.).

If desired, device 10 may include input-output devices such as optical components (e.g., cameras such as camera 20, camera flashes such as flash 22, light detectors such as a light detector in an optical proximity sensor, a light detector in an ambient light sensor, etc.). These components may operate behind transparent structures in device 10. For example, one or more optical components may be mounted behind a transparent member such as a transparent display layer (e.g., a portion of a display cover layer), a transparent window layer (e.g., a transparent planar disk or other transparent member mounted within an opening in an opaque plastic or metal housing wall or other housing structure), or a transparent housing wall (e.g., a planar layer of glass or plastic that forms a housing wall on a rear face of device 10 and/or other portion of device 10). To hide optical components such as these from view when not in use, device 10 may include one or more electrically adjustable shutters such as shutter 24. Shutter 24 may overlap one or more optical components such as camera 20 and/or flash 22. When it is desired to operate camera 20 and/or flash 22, control circuitry 12 may place shutter 24 in a transparent state. When camera 20 and/or flash 22 are not being used to capture images, control circuitry 12 may place shutter 24 in a non-transparent state (e.g., an opaque state), thereby helping to hide camera 20 and/or flash 22 from view from the exterior of device 10.

Figure 2:
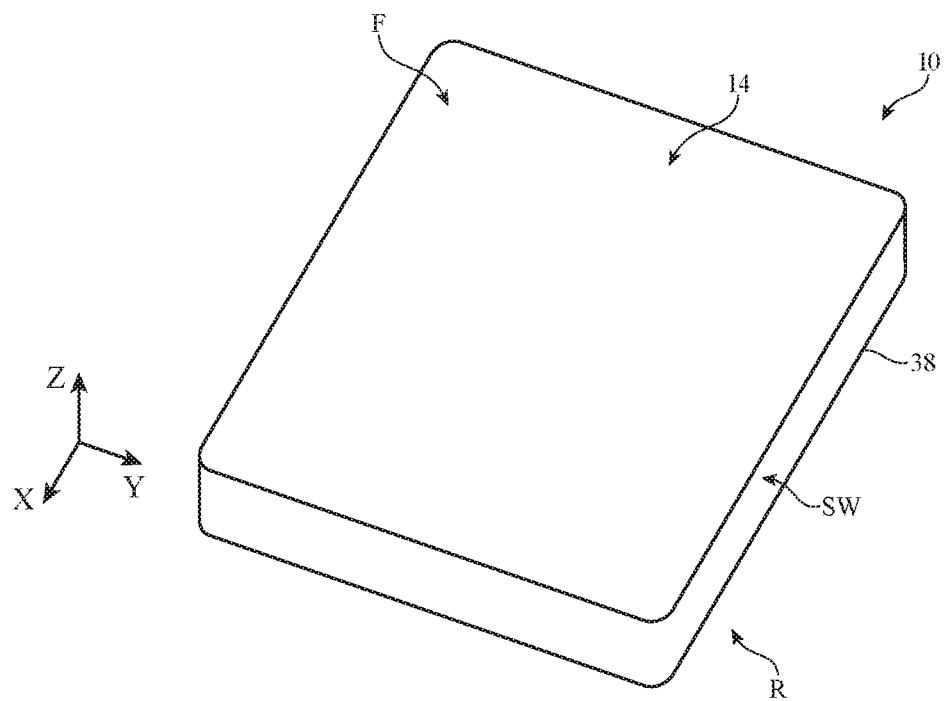
FIG. 2 is a perspective view of an illustrative electronic device in accordance with an embodiment.

A perspective view of an illustrative electronic device is shown in FIG. 2. As shown in FIG. 2, device 10 may include components such as display 14. Display 14 may be mounted in housing 38. Housing 38, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 38 may be formed using a unibody configuration in which some or all of housing 38 is machined or molded as a single structure or may be formed using multiple structures (e.g., an internal frame structure, one or more structures that form exterior housing surfaces, etc.). Housing 38 may, if desired, have multiple portions (e.g., first and second rigid portions that are coupled by a hinge).

Device 10 may have opposing front and rear faces such as front face F and rear face R. Straight and/or curved sidewalls SW may be formed around the periphery of device 10. Sidewalls SW may extend from rear face R to front face F and/or may be formed from separate housing structures in housing 38. Display 14 may be formed on front face F and a rear housing wall portion of housing 38 (e.g., a layer of polymer, metal, glass, other materials, and/or a combination of these material) may be formed on rear face R.

As described in connection with sensors 26 and 28, display 14 may incorporate one or more sensor layers such as a layer of conductive capacitive touch sensor electrodes or other touch sensor components (e.g., resistive touch sensor components, acoustic touch sensor components, force-based touch sensor components, light-based touch sensor components, etc.) and/or force sensor components. Force sensor circuitry for display 14 may include capacitive force sensor electrodes, resistive force sensor structures, strain gauges, piezoelectric force sensor circuitry, and/or other force sensor components.

Display 14 of device 10 may have a display cover layer. The display cover layer may overlap structures such as upper layer 14A and lower layer 14B. The display cover layer may be formed from clear glass or other transparent materials (e.g., plastic, ceramic, sapphire or other crystalline materials, etc.). In some configurations for device 10, a rear housing member and/or other housing structures may be formed from clear glass or other transparent materials (e.g., plastic, ceramic, sapphire or other crystalline materials, etc.).

Figure 3:
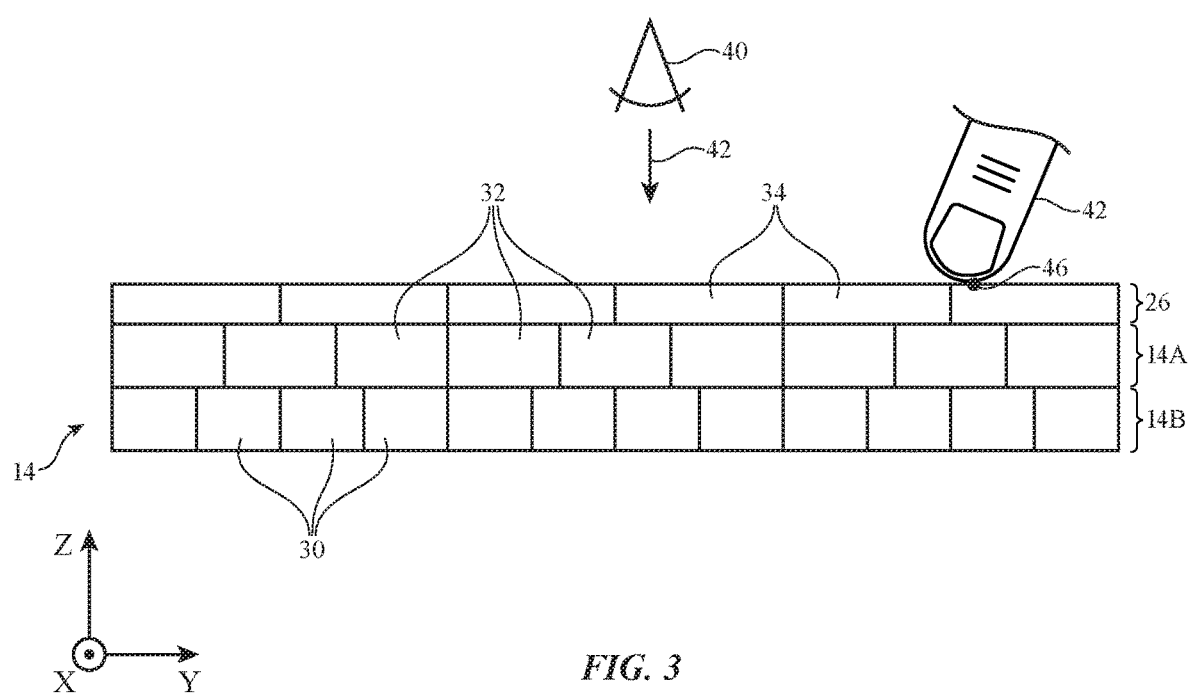
FIG. 3 is a cross-sectional side view of an illustrative display and overlapping touch sensor in accordance with an embodiment.

A cross-sectional side view of display 14 is shown in FIG. 3. As shown in FIG. 3, display 14 may include stacked display stages such as lower layer 14B (sometimes referred to as a rear or inner display layer) and upper layer 14A (sometimes referred to as a front or outer display layer or front or outer light-modulator layer). Touch sensor 26 may overlap layers 14A and 14B and may sometimes be considered to form a part of display 14. In the example of FIG. 3, touch sensor 26 has an array of touch sensor elements such as capacitive touch sensor electrodes 34. Electrodes 34 may be formed from transparent conductive material such as indium tin oxide and may therefore allow light from display 14 to be viewed by viewer (user) such as viewer 40 who is viewing display 14 in direction 42. There may be any suitable number of electrodes 34 in sensor 26 (e.g., at least 1, at least 10, at least 100, at least 1000, at least 10,000, fewer than 100,000, fewer than 5,000, fewer than 500, etc.). Electrodes 34 may have lateral dimensions of 1-100 mm, at least 1 mm, at least 10 mm, at least 100 mm, less than 100 mm, less than 5 mm, etc. Touch sensor electrode arrays with more electrodes will generally exhibit higher accuracy when determining the location of a user's finger input or stylus in the X-Y plane (see, e.g., finger 44, which is contacting sensor 26 at location 46 in the example of FIG. 3), but may use more touch sensor processing circuitry and/or may consume more power than touch sensor electrode arrays with fewer electrodes. Force sensing structures may be formed from one or more force sensing layers (e.g., layers in display 14 and/or layers that are overlapped by display 14) and/or may be formed from force sensors mounted at peripheral portions of display 14 (as examples).

As shown in FIG. 3, layer 14B may include an array of individually adjustable light-emitting elements such as pixels 30. During operation, pixels 30 may emit light. In some situations, control circuitry 12 may use pixels 30 to produce images. On other situations, pixels 30 may be configured to supply backlight illumination for layer 14A. In some scenarios, most or all of pixels 30 may be turned off to conserve power. When providing backlight illumination, all of pixels 30 and/or some of pixels 30 may be illuminated. Pixels 30 may include respective light-emitting diodes (e.g., crystalline semiconductor dies forming light-emitting diodes, organic light-emitting diodes, etc.), may be backlit liquid crystal display pixels, and/or may be other suitable pixels. In some configurations, pixels 30 may not emit light (e.g., when display 14B is a reflective liquid crystal display, etc.). Arrangements in which pixels 30 are light-emitting pixels that are configured to emit light that serves as backlight illumination and/or image light are sometimes described herein as an example.

Pixels 30 may have any suitable size. For example, pixels 30 may have lateral dimensions (dimensions in the plane in which display 14 lies) that are at least 1 micron, at least 10 microns, at least 100 microns, at least 1000 microns, less than 500 microns, less than 50 microns, etc. There may be any suitable number of pixels 30 in the pixel array of layer 14B (e.g., at least 10, at least 100, at least 1000, at least 10,000, at least 100,000, at least 1,000,000, at least 10,000,000, fewer than 100,000,000, etc.).

Layer 14A may include an array of individually adjustable light-modulator cells such as light-modulator cells 32 (sometimes referred to as individually adjustable regions, areas, pixels, etc.). Cells 32 may be selectively adjusted by control circuitry 12 to exhibit desired optical properties. In general, cells 32 may be characterized by any suitable adjustable optical properties (e.g., adjustable haze or light-scattering, adjustable light absorption, adjustable light transmission, adjustable light reflection, etc.).

During operation, control circuitry 12 may selectively adjust cells 32 to exhibit desired optical properties. As an example, cells 32 may be selectively placed in a transparent or window mode to allow light from pixels 30 to be viewed or a light-scattering or light-blocking mode in which light from pixels 30 is blocked or otherwise obscured due to enhanced haze (enhance light-scattering) and/or reduced light-transmission due to increased absorption in layer 14A and/or increased downwards light reflection by layer 14A. Cells 32 may also be adjusted to exhibit intermediate optical properties (e.g., a haze value or light absorption value that lies between the low haze and absorption characteristics associated with operation in the transparent mode and the high haze and absorption characteristics associated with operation in the light-blocking mode).

To conserve power in device 10, it may be desirable to form display layer 14A using a display technology that consumes less power than display layer 14B. In general, however, any suitable technology may be used in forming layer 14A. Illustrative examples of light modulating devices that may be used in forming layer 14A include electrochromic devices, suspended particles devices, liquid crystal light modulators (e.g., light-modulators based on liquid crystal layer sandwiched between polarizers), guest-host liquid crystal light modulators (e.g., light modulators in which guest dyes are incorporated into host liquid crystal material so that the guest-host liquid crystal light modulator may exhibit adjustable light transmission and adjustable color such as light transmission that varies from clear to dark and/or from clear to a particular non-neutral color, as determined by the color of the guest dye, polymer dispersed liquid crystal light modulators, guest-hose polymer dispersed liquid crystal light modulators, electrophoretic light modulators (sometimes referred to as e-ink devices), and/or other adjustable light modulator layers.

In some arrangements, there may be a relatively modest number of cells 32 in layer 14A (e.g., a smaller number of cells than the number of pixels in layer 14B). For example, there may be only a single cell 32 in layer 14A (e.g., layer 14A may be uniform throughout and may only be controlled globally) or there may fewer than 1000, fewer than 100, fewer than 10, or other relatively low number of cells 32 in layer 14A. In configurations such as these in which there is a relatively modest number of cells 32 in display layer 14A, one or more of cells 32 may be selectively placed in window mode when it is desired to allow light from pixels 30 to be viewed. Remaining cells may be placed in light blocking mode to obscure other pixels 30 from view. If desired, pixels 30 may all be turned off and all of cells 32 may be placed in light blocking mode or pixels 30 may be used in displaying image content over all of display 14 while cells 32 are made transparent.

In other arrangements, there are more cells 32 in display layer 14 (e.g., at least 1000, at least 10,000, at least 100,000, etc.). In these arrangements, the optical properties of cells 32 may be modulated in a pattern that that creates a visible image for viewer 40. While layer 14A is being used to create a visible image, pixels 30 may be used to supply layer 14A with backlight illumination. As an example, pixels 30 may be directed to display backlight illumination while cells 32 are being used to display text, icons, other graphical elements, or other content in layer 14A.

Figure 4:
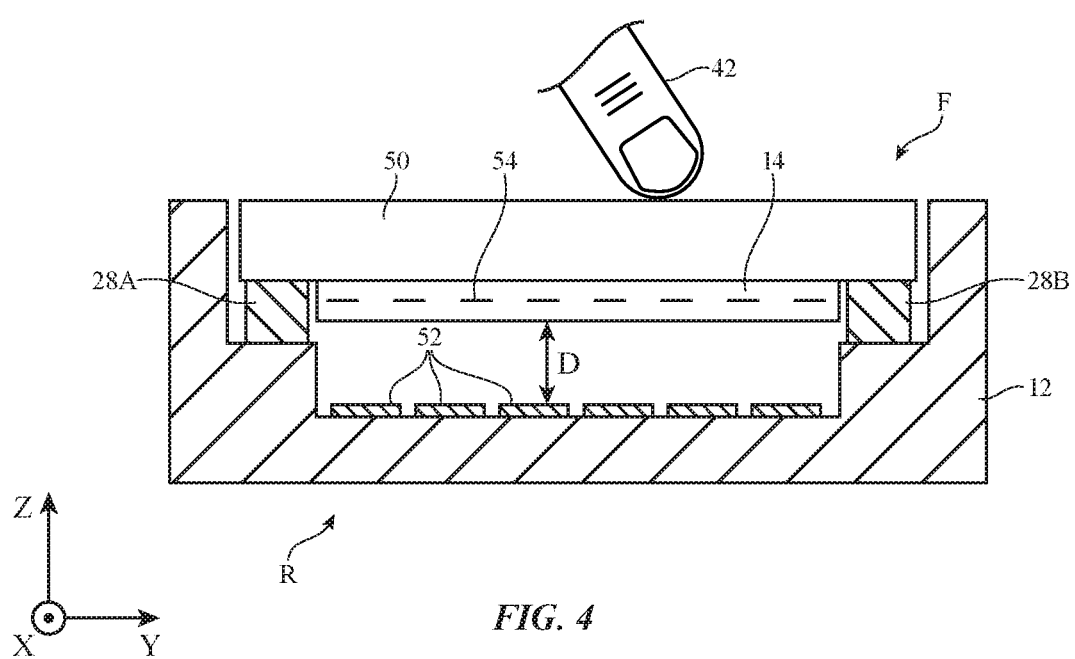
FIG. 4 is a cross-sectional side view of an electronic device with illustrative two-dimensional force sensors in accordance with embodiments.

The location of transparent windows in layer 14A and other aspects of the operation of display 14 may be determined based on user input from touch sensor 26 and/or force sensor 28. Illustrative structures for forming force sensor 28 in device 10 are shown in the cross-sectional side view of device 10 that is shown in FIG. 4. As shown in FIG. 4, display 14 may be mounted under display cover layer 50. Display 14 may include one or more conductive layers such as conductive layer 54. Conductive layer 54 may serve as a first capacitor electrode in a capacitive force sensor (force sensor 28 of FIG. 1). An associated conductive layer such as layer 52 may be supported by housing 38 and may serve as a second capacitor electrode in the capacitive force sensor. When an external object such as user finger 42 or a stylus presses display cover layer 50 (and therefore display 14 and electrode 54) downwardly in the −Z direction, the separation D between electrode 54 and electrode 52 will decrease and capacitance will increase. By measuring the change in capacitance that results from the applied force from finger (or stylus) 42, sensor 28 and control circuitry 12 may determine how forcefully display 14 is being pressed.

Sensor 28 may be provided with a two-dimensional array of electrode portions to provide sensor 28 with the ability to make force measurements in two dimensions. For example, an electrode in the force sensor may be segmented (see, e.g., electrode 52, which may have pads or other separate electrode areas). By monitoring the force signal from each segment of a segmented electrode, sensor 28 can determine the location in the X-Y plane where display 14 is being pressed (e.g., the location where the measured capacitance change is greatest).

If desired, a force sensor may be formed from one or more force sensing elements such as elements 28A and 28B that are interposed between display 14 (e.g., display cover layer 50) and housing 38. The force sensing elements (e.g., elements 28A and 28B) may be distributed around the edges of display 14. For example, one force sensing element (force sensor) such as element 28A may be formed on the left edge of display 14, another may be formed on the right edge of display 14 (e.g., element 28B), and additional force sensing elements may respectively be formed on the remaining two peripheral edges of display 14. The force sensing elements may be formed from capacitive force sensing elements, resistive force sensing elements, strain gauges, piezoelectric force sensing elements, or other force sensors. By processing signals from each of the four elements (or other suitable number of force sensing elements coupled to display 14), the location of applied force from finger (or stylus) 42 can be determined. If, for example, 99% of the force signal is measured by element 28B, control circuitry 12 can determine that display 14 is being pressed near element 28B. If the force signals measured by elements 28A and 28B are equal, control circuitry 12 can conclude that display 14 is being pressed at a point on display 14 that is midway between elements 28A and 28B.

Device 10 may use a two-dimensional force sensor 28 that is formed from a set of distributed discrete force sensing elements such as elements 28A and 28B and/or may use capacitive force sensor electrodes (e.g., electrodes 54 and 52), and/or may use other force sensor circuitry. If desired, signals from two-dimensional force sensors 28 such as the force sensors of FIG. 4 and signals from two-dimensional touch sensor 26 may also be combined to enhance force and/or touch input detection accuracy. For example, touch information from touch sensor 26 may be used to help determine the location of finger (or stylus) 42 while force sensor 28 is used in measuring the magnitude of applied force.

Figure 5:
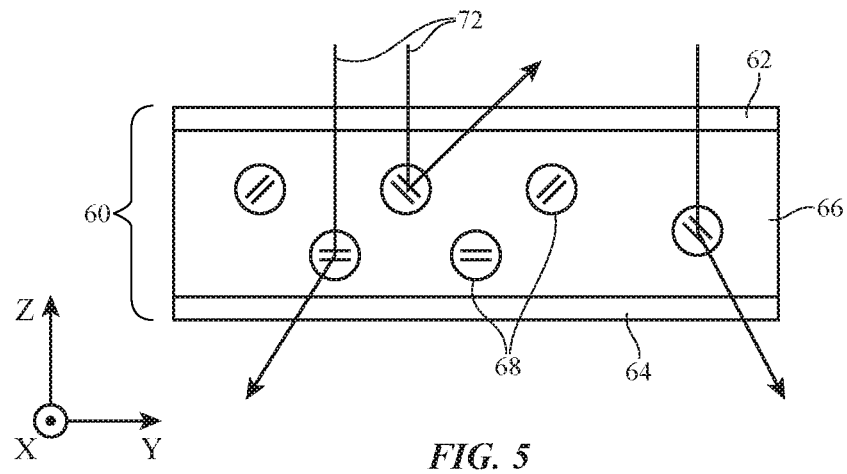
FIGS. 5 and 6 are cross-sectional side views of an illustrative polymer dispersed liquid crystal light modulator layer in respective light-scattering and transparent operating modes in accordance with embodiments.
Figure 6:
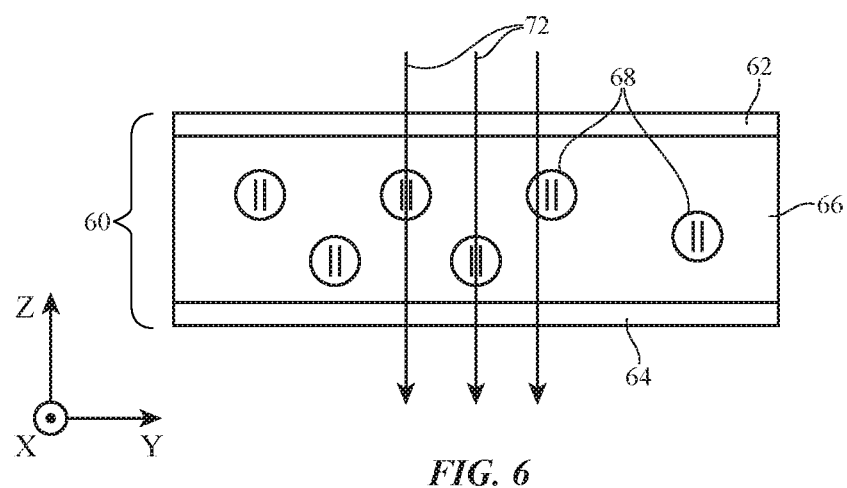

FIGS. 5 and 6 are cross-sectional side views of an illustrative polymer dispersed liquid crystal display layer that may be used in forming cells in layer 14A. As shown in FIG. 5, polymer dispersed liquid crystal display layer 60 has liquid crystals 68 (liquid crystal droplets) dispersed in polymer layer 66. Layer 66 is interposed between transparent electrodes 62 and 64. When a first signal is applied across layer 66 (e.g., when no voltage is applied across electrodes 62 and 64), liquid crystals 68 are randomly oriented. As a result, light rays 72 will experience index-of-refraction discontinuities between liquid crystals 68 and layer 66 that cause light rays 72 to scatter. When a second signal is applied across layer 66 (e.g., when a non-zero voltage is applied across electrodes 62 and 64), liquid crystals 68 will orient along the vertical electric field E that is generated across layer 66 and liquid crystal layers 68 and layer 66 will exhibit a uniform index-of-refraction to rays 72. This prevents light scattering by liquid crystals 68, as indicated by unscattered rays 72 of FIG. 6. In the configuration of FIG. 5, light scattering is relatively high, so layer 60 is hazy and can serve as a light-blocking structure. In the configuration of FIG. 6, light scattering and haze are reduced (e.g., the haze of layer 60 in FIG. 6 will be less than the haze of layer 60 in FIG. 5). The polymer dispersed liquid crystal layer arrangement of FIGS. 5 and 6 may therefore be used in modulating the haze (light-scattering) of cells 32 in layer 14A.

Figure 7:
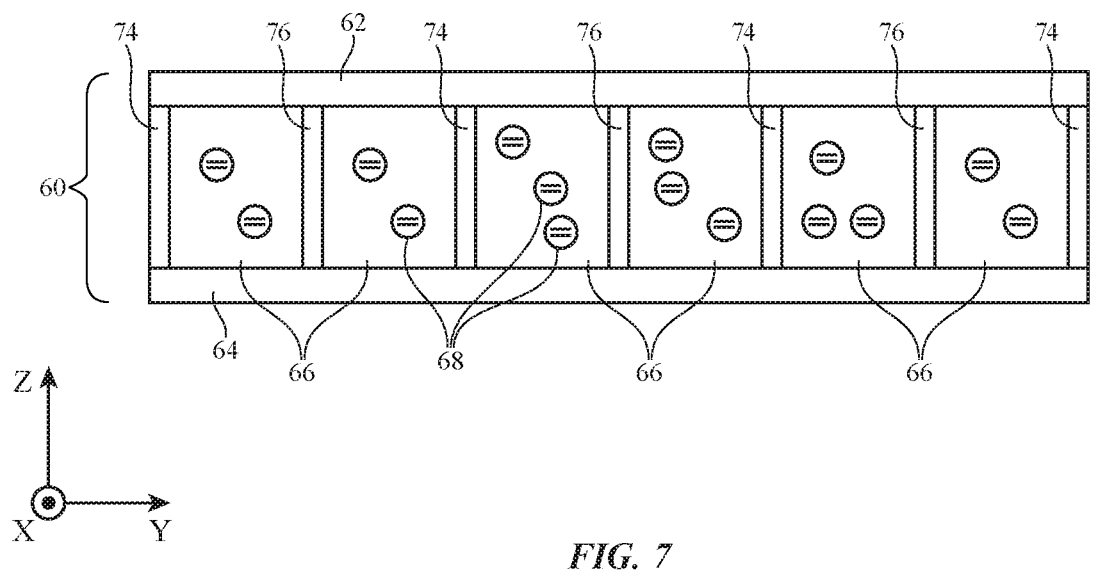
FIG. 7 is a cross-sectional side view of an illustrative polymer dispersed liquid crystal light modulator layer with horizontally and vertically oriented electrodes in accordance with an embodiment.

In the illustrative configuration of FIGS. 5 and 6, electrodes 62 and 64 are used to apply electric fields aligned with the vertical (Z-axis) direction. FIG. 7 is a diagram of an illustrative polymer dispersed liquid crystal layer 60 in which additional electrodes 74 and 76 have been provided to allow an electric field to be applied horizontally (aligned with the Y axis). During transparent mode operations, electrodes 74 and 76 are left floating and a vertical electric field is applied to layer 60 using electrodes 62 and 66, as described in connection with FIG. 6. During light blocking (light scattering) mode operations, electrodes 62 and 64 are left floating and a horizontal electric field is applied along the Y axis (e.g., an electric field is applied that is perpendicular to the field applied using electrodes 62 an 66). This orients liquid crystals 68 in their maximum light scattering (maximum refractive index discontinuity) orientation and maximizes scattering of light 72 passing through layer 60. As a result, layer 60 may scatter more light when the applied field is horizontal than when no electric field is applied and the liquid crystals 68 are randomly oriented as described in connection with FIG. 5. When high levels of haze are achieved (e.g., using layer 60 of FIG. 7 in the horizontal electric field state), layer 60 may appear bright white or, in a guest-host polymer dispersed liquid crystal configuration, layer 60 may appear to have a color associated with a guest dye that is included in liquid crystals 68.

Using other cell constructions (e.g., cells 32 based on liquid crystal light modulator layers with polarizers, electrochromic layers, suspended particle device layers, guest-host liquid crystal layers, electrophoretic layers, electrowetting layers, and/or other light modulator layers), may be used in forming cells 32 of layer 14A. The examples of FIGS. 5, 6, and 7 are merely illustrative.

Figure 8:
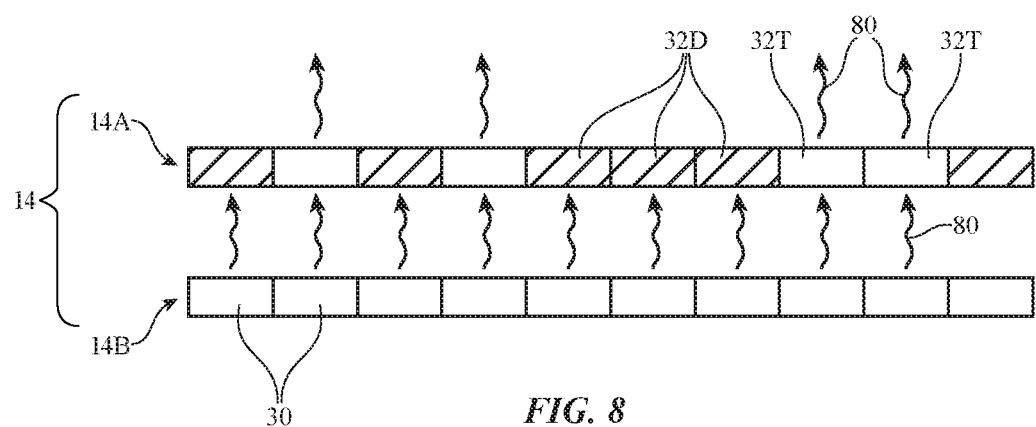
FIG. 8 is a cross-sectional side view of an illustrative polymer dispersed liquid crystal layer in a mode of operation in which a lower display layer is providing backlight for an upper display layer in accordance with an embodiment.

FIG. 8 is a cross-sectional side view of display 14 in an illustrative configuration in which cells 32 of layer 14A have been patterned to form a desired image and in which layer 14B is providing backlight illumination 80 for layer 14A. Light 80 is blocked in cells 32 that are not clear (e.g., that exhibit high haze, high reflectivity, and/or high absorption) such as cells 32D and is transmitted to form an image for the user in cells 32 that are clear such as cells 32T. Illumination 80 may be uniform, may be monochromatic, may be colored, and/or may have patterns (e.g., intensity gradients, color gradients, colored patterns, and/or patterns with variations in light intensity across display 14, etc.). Illumination 80 may be static or may be time-varying (e.g., to create sparkling effects, etc.).

Figure 9:
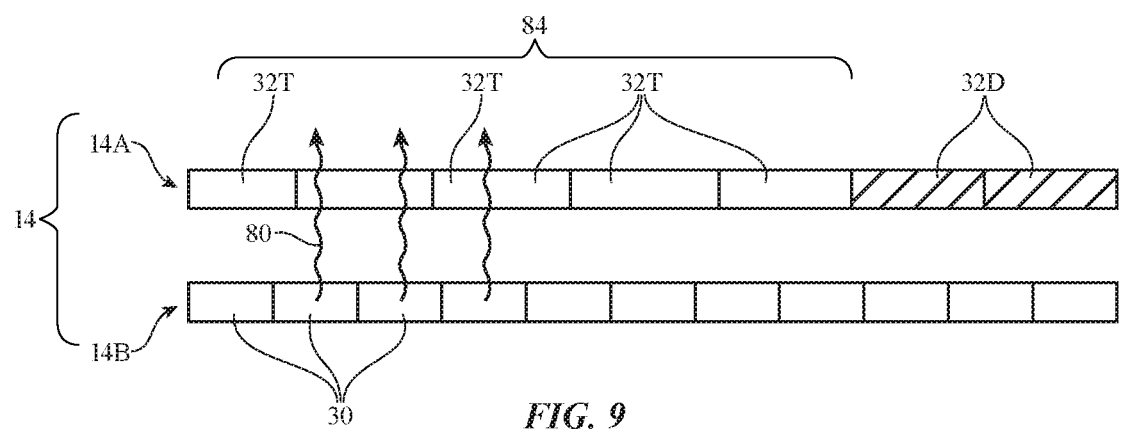
FIG. 9 is a cross-sectional side view of an illustrative display in a mode of operation in which an upper display layer has a transparent window region that allows images on an overlapped portion of a lower display layer to be viewed in accordance with an embodiment.

FIG. 9 is a cross-sectional side view of display 14 in an illustrative configuration in which a block of adjacent cells 32 have been made transparent (cells 32T), while remaining cells 32D are in their light blocking mode. This forms a transparent window (or, if desired, multiple windows) such as window 84 through which an image formed from light 80 being emitted by pixels 30 in layer 14B may be viewed.

Figure 10:
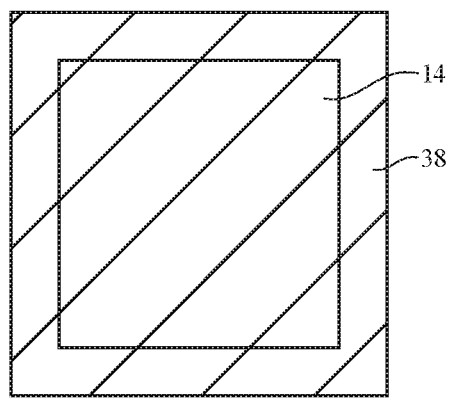
FIG. 10 is a diagram of an illustrative electronic device in which an upper display layer has been adjusted to exhibit an appearance that matches an adjacent housing structure in accordance with an embodiment.
Figure 11:
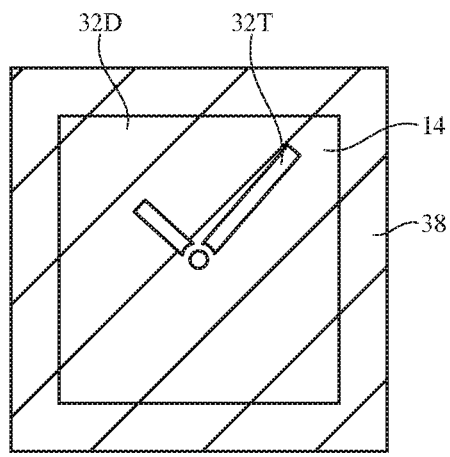
FIG. 11 is a diagram of the illustrative electronic device of FIG. 10 in which pixels in the upper display layer have been adjusted to produce an image while backlight is being provided by a lower display layer in accordance with an embodiment.
Figure 12:
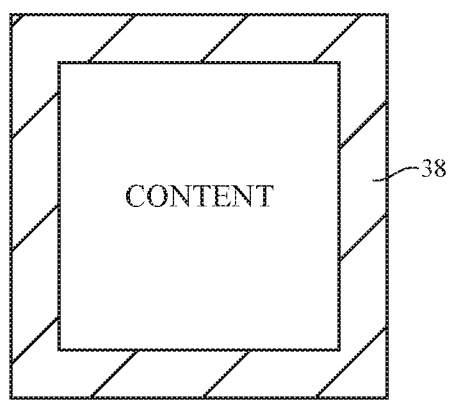
FIG. 12 is a diagram of the illustrative electronic device of FIG. 10 in which pixels in a lower display layer are supplying an image while the upper display layer has a portion that has been adjusted to form a transparent window in accordance with an embodiment.

FIGS. 10, 11, and 12 show how display 14 may be adjusted in illustrative operating modes.

In the example of FIG. 10, layer 14B is not being used to display images and pixels 30 have been powered down to conserve power. In this situation, cells 32 in layer 14A may, if desired, be placed in the light-blocking mode. The color of layer 14A in the light blocking mode may be controlled by appropriate selection of the thickness of cells 32, the electrode configuration for cells 32, the dye or dyes incorporated into cells 32 to impart colors to liquid crystals, and/or other structures and materials in cells 32. With the illustrative configuration of FIG. 10, housing 38 has walls that have a given color (e.g., a neutral color such as white or black or a non-neutral color such as yellow, red, blue, green, etc.). Cells 32 in layer 14A have been configured so that layer 14A exhibits a matching color when cells 32 are in their light blocking mode of operation. By matching the colors of cells 32 and therefore display 14 to housing 38, device 10 may have a uniform appearance (e.g., all black, all white, all red, all yellow, etc.). Arrangements in which contrasting and/or otherwise coordinated color schemes are produced may also be used, if desired (e.g., an arrangement in which display 14 is white and in which housing 38 is black, etc.).

FIG. 11 shows how portions of layer 14A (e.g., transparent cells 32T) may be patterned to form an image in layer 14A. In the example of FIG. 11, the image that is being produced corresponds to a set of watch hands that tell the current time. Other patterns may be formed in layer 14A, if desired (e.g., text, graphics, icons, still and/or moving images, etc.). A pattern may be formed with cells 32T while cells 32D form a background and/or the pattern may be formed with cells 32D while cells 32T form a background. Configurations in which cells 32 are provided with continuously varying voltages and exhibit corresponding gradations of light-blocking characteristics (e.g., a grayscale arrangement) may also be used. During the operations of FIG. 11, lower layer 14B may be off, may provide fixed and/or time-varying uniform backlight illumination, and/or may provide fixed and/or time-varying patterned backlight illumination. If desired, layer 14A may be used to display dim images (e.g., as part of a "night mode" operation in which backlight from pixels 30 is dimmed to facilitate reading in a dark environment).

If desired, layer 14A and layer 14B may, during some operations, display the same type of information. For example, layer 14A may be patterned to form keys labels on a touch sensitive display (e.g., a touch bar on a laptop computer, etc.). During low power normal operations, the pixels of layer 14B in the display can be turned off to save power. When a user touches the display or otherwise awakens the display from its low power mode, pixels in layer 14B may be turned on gradually to return color saturation and brightness to the display. As part of this process, the pattern of key labels that was being displayed by layer 14A may be replaced gradually by the colored and bright key labels of display layer 14B. After a period of inactivity, this process may be reversed (e.g., pixels 30 may be dimmed while the key labels or other content that was being displayed by pixels 30 are gradually replaced by corresponding identical (or nearly identical) key labels or other content in layer 14A. Home screen content, icons, text, images, and/or other content may be saturated and desaturated in this way, while transitioning between use of layer 14A and layer 14B to provide visual output.

The locations of transparent windows such as illustrative transparent window 84 of FIG. 9 may be set as defaults in control circuitry 12 and/or may be adjusted dynamically based on user input. User input such as touch and/or force input to touch sensor 26 and/or force sensor 28 may, as an example, be used to invoke a window 84 and/or to control where the invoked window is located. User input may be used in selecting desired content to display in a window 84 or predetermined content or types of content may be associated with particular window locations.

Figure 13:
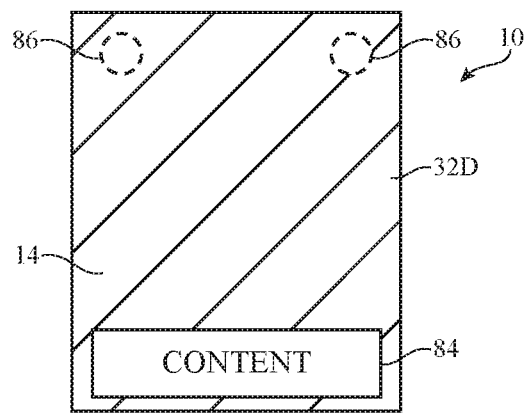
FIGS. 13, 14, and 15 are diagrams showing illustrative transparent window configurations that may be formed in response to user input such as force sensor input and/or touch sensor input provided with a finger or stylus in accordance with an embodiment.
Figure 14:
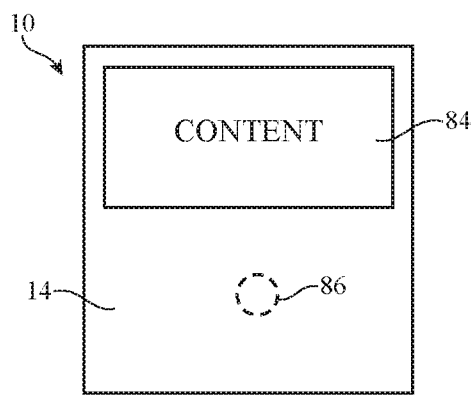
Figure 15:
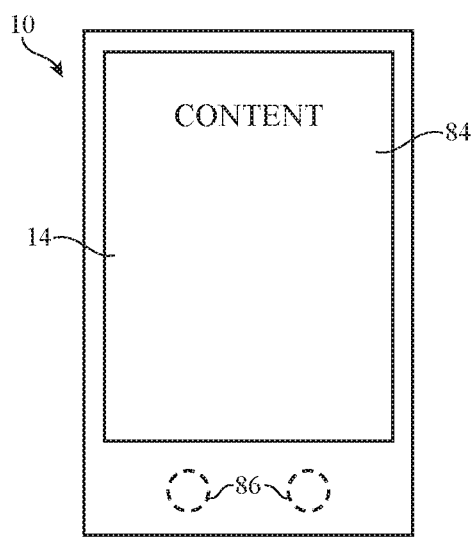

Consider, as examples, the arrangements of FIGS. 13, 14, and 15.

In the example of FIG. 13, a user provides touch and/or force input to locations such as locations 86 on display 14, causing window 84 to be formed in layer 14A of display 14 near the lower edge of display 14. When window 84 appears, display layer 14B may display content in window 84. As an example, if a user presses finger (or stylus) 42 in the location 86 at the upper left, control circuitry 12 may display content in window 84 such as a set of icons corresponding to the user's most frequently used applications (or a default set of applications). As another example, if a user presses finger (or stylus) 42 in the location 86 at the upper right, control circuitry 12 may display content in window 84 such as the last text message received by device 10 (or last email, etc.).

Another illustrative scenario is shown in FIG. 14. If the user presses finger (or stylus) 42 in location 86 (e.g., to supply touch input and/or force input), window 84 may be created in layer 14A along the upper edge of display 14 (as an example). The last video or other media that was played by the user may then be presented by the pixels in the portion of layer 14B that is overlapped by window 84. If desired, multiple presses with different forces (e.g., in the same location) may be used to display different information and/or windows on display 14. If, for example, a user presses 42 in a location at the top of the screen with a first force (e.g., 1N of force) a window such as window 84 may be opened at the top of the screen with first content (text, icons, video, etc.). If the user subsequently (or initially) presses the same spot at the top of display 14 with a second force (e.g., 20N of force) that is greater than the first force, a second window (e.g., a window with second content (text, icons, video, etc.) that is different than the first content may be opened. The second window may be located in the same location or a different location than the first window. For example, the second window may be a window at the bottom of the display such as window 84 of FIG. 13. Operations such as these may be performed without requiring a user to move their finger or stylus to a different location on display 14.

In some arrangements, multi-touch input (two or more fingers 42 pressing on display 14 in different locations) may be used to configure display 14. As shown in FIG. 15, for example, when a user presses on locations 86 (e.g., simultaneously), window 84 may cover some or most of display 14 and may display an abstract pattern on display 14 (e.g., in layer 14A while layer 14B provides backlight illumination or is turned off to conserve power).

If desired, other types of user input (e.g., voice commands, commands conveyed from a remote control, three-dimensional gesture input such as hand wave commands, button press input, keyboard input, and/or other user input) may be used in determining how display 14 is configured and determining the content to be displayed for the user. If desired, a user may drag and drop windows 84, may create multiple windows 84, etc. Sensor data and wirelessly received information from other devices may also be used in configuring display 14 (e.g., to create a window 84) and selecting content for displaying to the user. In some arrangement, display 14 is adjusted automatically by device 10 (e.g., to create a window when a text message is received so that the user can view the text message on layer 14B, to create a window in response to the occurrence of calendar events, email messages, alarms, and/or other window creation criteria).

Adjustable shutter 24 may be formed from light modulator structures such as the structures used in forming cells 32. For example, adjustable shutter 24 may be formed from a liquid crystal light modulator layer, an electrochromic light modulator layer, a suspended particle device layer, a guest-host liquid crystal layer, a polymer dispersed liquid crystal layer (with or without a guest dye in the liquid crystals), an electrophoretic layer, an electrowetting light modulator layer, and/or other light modulator layers. In use in shutter 24, these layers may be modulated between a transparent state and a light-blocking state (e.g., shutter 24 generally does not need to be used in a semi-transparent grayscale state).

Figure 16:
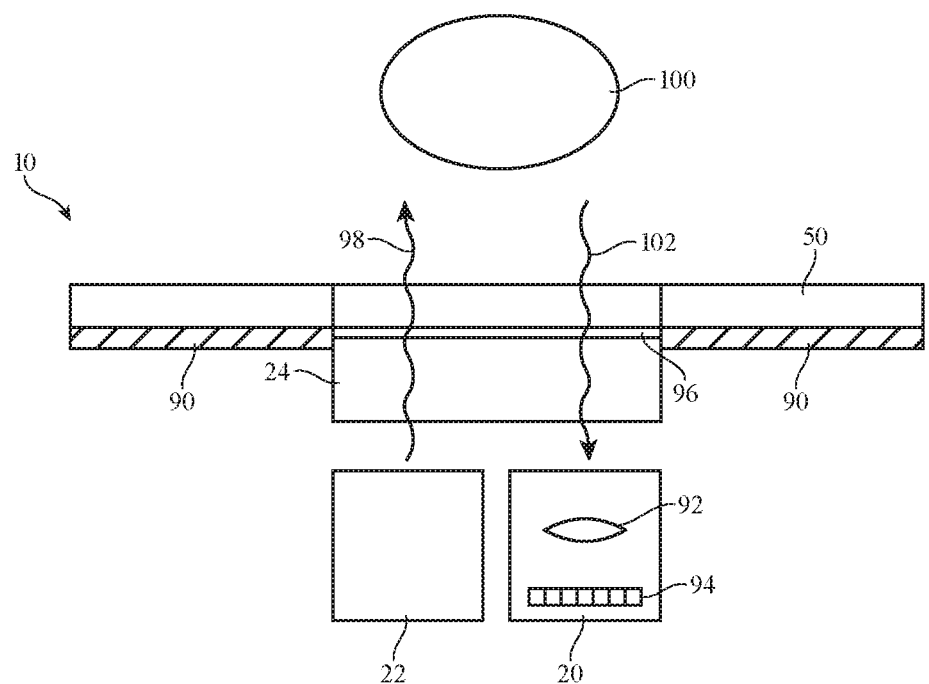
FIGS. 16 and 17 are cross-sectional side views of portions of illustrative electronic devices with electrically adjustable shutters to conceal optical components such as cameras and camera flashes in accordance with embodiments.
Figure 17:
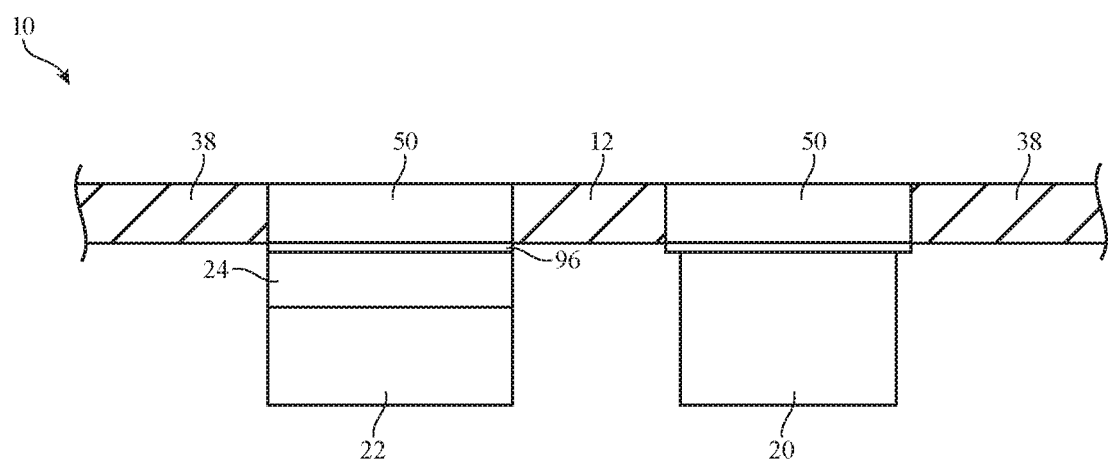

FIGS. 16 and 17 show how shutter 24 may overlap optical components in device 10 to hide these components from view when not in use.

In the arrangement of FIG. 16, shutter 24 has been mounted to the underside of layer 50 with transparent adhesive layer 96. Opaque masking layer 90 may be used to block light in adjacent portions of layer 50, if desired. Layer 50 may form part of display cover layer 50 (FIG. 4), may be part of a transparent glass or polymer layer forming a rear housing wall on rear face R of housing 38, may be part of a transparent window layer in housing 38, etc.

During operation, flash 22 (e.g., one or more light-emitting diodes) may emit light 98. Shutter 26 is interposed between layer 50 and flash 22. Control circuitry 12 issues a control signal to shutter 26 just before flash 22 is fired to place shutter 26 in its transparent state. This allows flash light 98 to serve as illumination for external objects such as object 100 in the field of view of camera 20. Camera 20 may receive light 102 reflected from object 100 through layer 50 and through transparent shutter 26.

Camera 20 may have a lens such as lens 92 that focuses light from object 100 onto digital image sensor, thereby capturing a digital image of object 100 illuminated by flash 22. Shutter 26 can be turned on and off quickly (e.g., in 1-100 ms, at least 1 ms, less than 300 ms, less than 30 ms, or other suitable time period). As a result, there may be minimal delay in transitioning shutter 26 from its normal light-blocking state to its temporary transparent state to allow light 98 and 102 to pass. There may also be minimal delay in transitioning shutter 26 from its temporary transparent state back to its normally light-blocking state following image capture operations with flash 22 and camera 20.

In the normal light-blocking state, shutter 26 may be characterized by low light transmission (e.g., high absorption and/or high haze), so internal optical components such as flash 22 and camera 20 are hidden from view. The appearance of shutter 26 in its low light transmission state may be matched to that of surrounding portions of device 10. For example, if opaque masking layer 90 is black, shutter 26 may be configured to be black when not in its transparent state (e.g., by incorporating a black dye in to a guest-host liquid crystal light modulator and applying a voltage to the liquid crystal light modulator during normal operation to place shutter 26 in a black non-transparent state). Shutter 26 may also be configured to have other colors when not in its transparent mode (e.g., a white to match a white housing, etc.).

In the illustrative arrangement of FIG. 17, camera 20 is not overlapped by shutter 26. This type of arrangement may help eliminate any potential haze exhibited by shutter 26 from captured image light. Shutter 24 overlaps flash 22, which may be mounted under a common transparent member with camera 20 or, as shown in FIG. 17 may be mounted in a transparent layer 50 that is separate from an additional transparent layer 50 that overlaps camera 20. Layers 50 may be parts of a display cover layer, housing layer portions, and/or other transparent portions of device 10. In the example of FIG. 17, layers 50 are transparent window member mounted in an opaque housing wall of housing 38.

Figure 18:
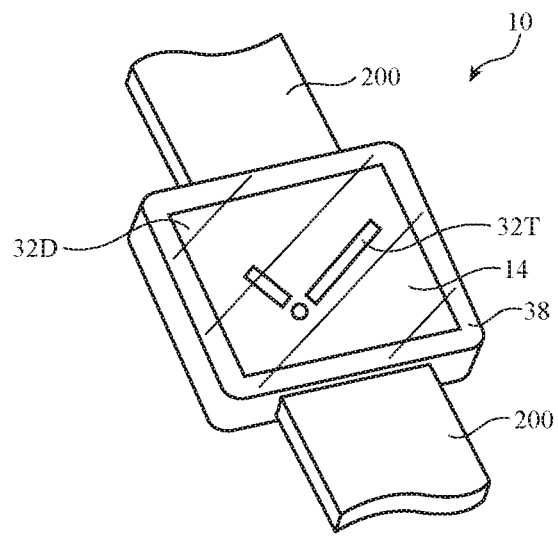
FIG. 18 is a perspective view of an illustrative watch with illustrative transparent window configurations in accordance with an embodiment.

FIG. 18 is a perspective view of an illustrative watch that may be configured with a transparent window portion. As shown in FIG. 18, watch (device 10) may have a strap such as strap 200 that is coupled to housing 28.

Figure 19:
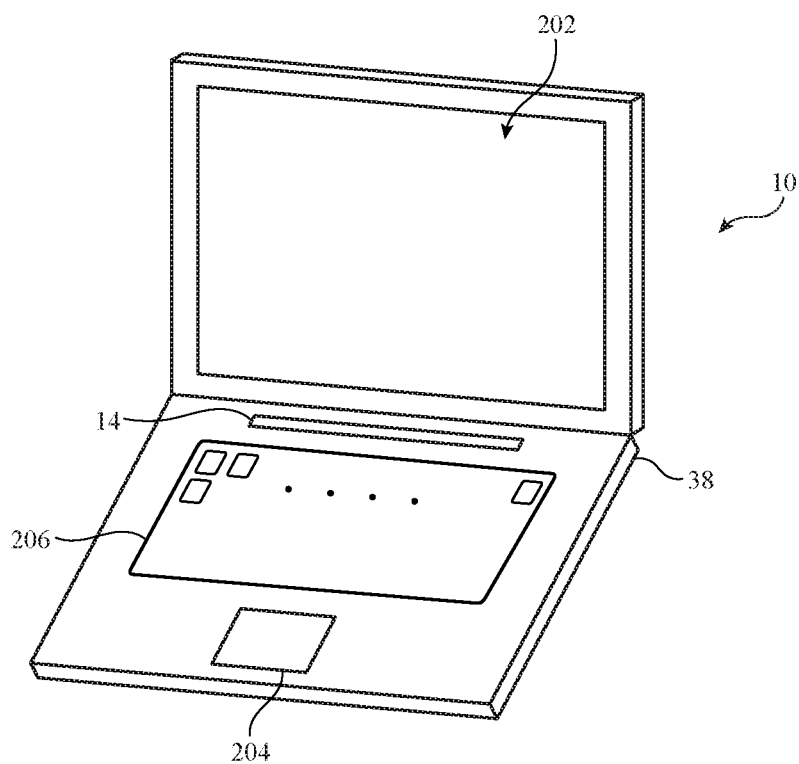
FIG. 19 is a perspective view of an illustrative laptop computer having a touch sensitive region with illustrative transparent window configurations in accordance with an embodiment.

In the example of FIG. 19, device 10 is a laptop computer having a housing 38 in which a touch sensor (touch pad) 204, keyboard 206, and display 202 have been mounted. In this type of arrangement, display 14 may form a touch sensitive bar (e.g., a touch bar, sometimes referred to as a dynamic function row) for device 10.

The foregoing is merely illustrative and various modifications can be made to the described embodiments. The foregoing embodiments may be implemented individually or in any combination.

What is claimed is:

1. An electronic device, comprising:
a housing having an appearance;
a display in the housing having a light modulator layer with an array of individually adjustable cells and having a display layer with an array of pixels, wherein the individually adjustable cells are configured to transition between an opaque mode in which all of the individually adjustable cells are opaque and a transparent mode in which at least some of the individually adjustable cells are transparent, wherein the individually adjustable cells are configured to block the array of pixels in the opaque mode, and wherein the opaque individually adjustable cells are configured to match the appearance of the housing;
a two-dimensional sensor configured to detect an input on the display; and
control circuitry configured to adjust the light modulator layer based on the input detected with the two-dimensional sensor to transition a subset of the individually adjustable cells from the opaque mode to the transparent mode and form a transparent window in the light modulator layer, wherein the pixels in the array of pixels are configured display an image through the transparent window.

2. The electronic device defined in claim 1 wherein the two-dimensional sensor comprises a two-dimensional force sensor that is configured to gather a force measurement and wherein the control circuitry is configured to select the image and the subset of individually adjustable cells to place into the transparent mode based on a force and a location associated with the force measurement.

3. The electronic device defined in claim 1 wherein the two-dimensional sensor comprises a touch sensor having transparent capacitive touch sensor electrodes overlapping the display.

4. The electronic device defined in claim 1 wherein the two-dimensional sensor comprises a two-dimensional force sensor.

5. The electronic device defined in claim 4 further comprising a display cover layer overlapping the display, wherein the two-dimensional force sensor comprises force sensing elements interposed between peripheral edge portions of the display cover layer and the housing.

6. The electronic device defined in claim 4 wherein the two-dimensional force sensor comprises a two-dimensional capacitive force sensor having capacitive electrodes overlapping the display.

7. The electronic device defined in claim 1 wherein the light modulator layer comprises a layer selected from the group consisting of: a liquid crystal light modulator layer with polarizers, an electrochromic layer, a suspended particle device layer, a guest-host liquid crystal layer, an electrophoretic layer, and an electrowetting layer.

8. The electronic device defined in claim 1 wherein the light modulator layer comprises a polymer dispersed liquid crystal layer and wherein the array of pixels comprises an array of light-emitting diode pixels.

9. The electronic device defined in claim 8 wherein the polymer dispersed liquid crystal liquid has first electrodes on opposing upper and lower surfaces of the polymer dispersed liquid crystal layer that are configured to apply an electric field to liquid crystals in the polymer dispersed liquid crystal layer in a first direction and has second electrodes that are configured to apply an electric field to the liquid crystals in a second direction that is perpendicular to the first direction.

10. The electronic device defined in claim 1 further comprising:
a camera;
a camera flash; and
an electrically adjustable shutter that overlaps the camera flash and that is operable in a light-blocking mode and a transparent mode, wherein the electrically adjustable shutter is transparent in the transparent mode and allows light from the camera flash to illuminate an external object while the camera captures an image of the eternal object.

11. The electronic device defined in claim 10 wherein the electrically adjustable shutter comprises a guest-host liquid crystal layer.

12. The electronic device defined in claim 1 wherein the control circuitry is further configured to use the display layer to display a text message in the window in response to a first input on the display in a first location and is further configured to use the display layer to display icons in the window in response to a second input on the display in a second location that is different than the first location.

13. The electronic device defined in claim 12 wherein the first input comprises a first force input, wherein the second input comprises a second force input, and wherein the two-dimensional sensor is configured to gather the first and second force inputs.

14. The electronic device defined in claim 12 wherein the first input comprises a first touch input, wherein the second input comprises a second touch input, and wherein the two-dimensional sensor is configured to gather the first and second touch inputs.

15. The electronic device defined in claim 12 wherein the first input comprises a first touch and force input, wherein the second input comprises a second touch and force input, and wherein the two-dimensional sensor is configured to gather the first touch and force input and is configured to gather the second touch and force input.

16. The electronic device defined in claim 1 wherein the control circuitry is further configured to use the display layer to display first content in the window in response to first input against the display in a first location and is further configured to use the display layer to display second content that is different than the first content in the window in response to second input against the display in a second location that is different than the first location.

17. The electronic device defined in claim 16 wherein the first input comprises a first force input, wherein the second input comprises a second force input, and wherein the two-dimensional sensor is configured to gather the first and second force inputs.

18. The electronic device defined in claim 16 wherein the first input comprises a first touch input, wherein the second input comprises a second touch input, and wherein the two-dimensional sensor is configured to gather the first and second touch inputs.

19. The electronic device defined in claim 16 wherein the first input comprises a first touch and force input, wherein the second input comprises a second touch and force input, and wherein the two-dimensional sensor is configured to gather the first touch and force input and is configured to gather the second touch and force input.

20. The electronic device defined in claim 1 wherein the control circuitry is further configured to adjust the light modulator layer to form watch hands on the display.

21. The electronic device defined in claim 20 wherein the control circuitry is further configured to provide backlight illumination for the watch hands using pixels in the pixel array that are overlapped by the watch hands.

22. The electronic device defined in claim 1 wherein the two-dimensional sensor is further configured to detect an additional input on the display, wherein the input comprises a first amount of pressure on the display at a location, wherein the additional input comprises a second amount of pressure on the display at the location that is greater than the first amount of pressure, wherein the control circuitry is further configured to place an additional subset of the individually adjustable cells into a transparent mode and form an additional transparent window in the light modulator in response to the additional input, wherein the additional transparent window is different than the transparent window, and wherein the pixels in the array of pixels are configured to display an additional image that is different than the image through the additional transparent window.

23. An electronic device, comprising:
a housing;
a display in the housing having a display layer with an array of pixels configured to produce light and having an overlapping light modulator layer with an array of individually adjustable cells; and
control circuitry configured to place a set of the individually adjustable cells in a transparent mode to form an image on the display while generating time-varying backlight illumination for the individually adjustable cells in the transparent mode with the array of pixels, and wherein the control circuitry is configured to adjust the light modulator layer to form watch hands on the display.

24. The electronic device defined in claim 23 further comprising a two-dimensional sensor that determines a location of an input on the display, wherein the control circuitry is configured to form a transparent window in the light modulator layer by placing a block of the individually adjustable cells in the transparent mode in response to the location of the input.

25. The electronic device defined in claim 24 wherein the input comprises touch input and wherein the two-dimensional sensor is configured to gather the touch input.

26. The electronic device defined in claim 24 wherein the input comprises force input and wherein the two-dimensional sensor is configured to gather the force input.

27. The electronic device defined in claim 24 wherein the input comprises touch and force input and wherein the two-dimensional sensor is configured to gather the touch and force input.

28. An electronic device, comprising:
a housing;
a display in the housing having a light modulator layer with an array of individually adjustable cells and having a display layer with an array of pixels configured to produce light that passes through the light modulator layer, wherein the individually adjustable cells are configured to be opaque in an opaque mode, and wherein the opaque individually adjustable cells have an appearance that matches the housing;
a sensor responsive to input on the display; and
control circuitry configured to adjust the light modulator layer based on information from the sensor to place a block of the individually adjustable cells into a transparent mode to form a transparent window in the light modulator layer through which pixels in the array of pixels display an image, wherein a location and size of the transparent window is based on the input on the display.

29. The electronic device defined in claim 28 wherein the sensor is configured to determine a force magnitude and an input location associated with the input on the display and wherein the control circuitry is configured to select the block of individually adjustable cells to place into the transparent mode based on the force magnitude and input location.

30. The electronic device defined in claim 28 wherein the sensor comprises a touch sensor and wherein the control circuitry is configured to select the block of individually adjustable cells to place into the transparent mode based on touch input from the touch sensor.

31. The electronic device defined in claim 28 wherein the sensor comprises a force sensor and wherein the control circuitry is configured to select the block of individually adjustable cells to place into the transparent mode based on force input from the force sensor.

32. The electronic device defined in claim 23 wherein the control circuitry is configured to place an additional set of the individually adjustable cells in an opaque mode and wherein the individually adjustable cells in the opaque mode match an appearance of the housing.

33. The electronic device defined in claim 23 further comprising:
a force sensor configured to detect force applied to the display wherein the force sensor is configured to detect a first input of a first amount of pressure, wherein the force sensor is configured to detect a second input of a second amount of pressure that is greater than the first amount of pressure, wherein the control circuitry is configured to place a first set of the individually adjustable cells in a transparent mode to form an image on the display in response to the first input, wherein the control circuitry is configured to place a second set of the individually adjustable cells in a transparent mode in response to the second input, and wherein the second set of individually adjustable cells has more individually adjustable cells than the first set.

* * * * *